(12) United States Patent
Preisler et al.

(10) Patent No.: US 8,764,089 B2
(45) Date of Patent: Jul. 1, 2014

(54) COMPRESSION-MOLDED COMPOSITE PANEL INCLUDING A LIVING HINGE HAVING A SCORE LINE WHICH FUNCTIONS AS A STYLE LINE

(71) Applicant: Global IP Holdings, LLC, Sterling Heights, MI (US)

(72) Inventors: Darius J. Preisler, Macomb, MI (US); Christopher A. Heikkila, Washington Township, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 78 days.

(21) Appl. No.: 13/686,388

(22) Filed: Nov. 27, 2012

(65) Prior Publication Data

US 2013/0278015 A1     Oct. 24, 2013

Related U.S. Application Data

(63) Continuation-in-part of application No. 13/603,552, filed on Sep. 5, 2012, which is a continuation-in-part of application No. 13/453,201, filed on Apr. 23, 2012, now Pat. No. 8,690,233, application No. 13/686,388, which is a continuation-in-part of application No. 13/453,269, filed on Apr. 23, 2012.

(51) Int. Cl.
*B60N 3/12* (2006.01)
(52) U.S. Cl.
USPC ........................ 296/39.3; 296/97.23; 428/98
(58) Field of Classification Search
CPC ...... B60R 13/01; B60R 13/011; B60R 13/013
USPC ............ 296/39.3, 97.23, 193.07; 428/98, 116
See application file for complete search history.

(56) References Cited

U.S. PATENT DOCUMENTS

| | | | |
|---|---|---|---|
| 5,298,694 | A | 3/1994 | Thompson et al. |
| 5,502,930 | A | 4/1996 | Burkette et al. |
| 5,915,445 | A | 6/1999 | Rauenbusch |
| 5,979,962 | A | 11/1999 | Balentin et al. |
| 6,050,630 | A | 4/2000 | Hochet |
| 6,102,464 | A | 8/2000 | Schneider et al. |
| 6,435,577 | B1 | 8/2002 | Renault |
| 6,537,413 | B1 | 3/2003 | Hochet et al. |
| 6,631,785 | B2 | 10/2003 | Khambete et al. |
| 6,655,299 | B2 | 12/2003 | Preisler et al. |
| 6,659,223 | B2 | 12/2003 | Allison et al. |
| 6,682,676 | B1 | 1/2004 | Renault et al. |
| 6,720,058 | B1 | 4/2004 | Weeks et al. |
| 6,748,876 | B2 | 6/2004 | Preisler et al. |
| 6,790,026 | B2 | 9/2004 | Vandangeot et al. |

(Continued)

*Primary Examiner* — Joseph Pape
(74) *Attorney, Agent, or Firm* — Brooks Kushman P.C.

(57) ABSTRACT

A compression-molded, composite panel for a vehicle interior is provided. A substantially continuous facing material layer has an outwardly-facing surface for display in the interior of the vehicle. The facing material layer is bonded to the outer surface of a first skin of the panel by press molding. The press molding forms a first portion of the panel and a second portion of the panel pivotally connected to the first portion. A living hinge includes a portion of the facing material layer which allows the second portion of the panel to pivot between different use positions relative to the first portion of the panel. A score line formed by the press molding in the outwardly-facing surface of the portion of the facing material layer at least partially defines the living hinge and functions as a style line to mask facing material damage or imperfections at the outwardly-facing surface.

20 Claims, 2 Drawing Sheets

(56) References Cited

U.S. PATENT DOCUMENTS

| | | |
|---|---|---|
| 6,793,747 B2 | 9/2004 | North et al. |
| 6,823,803 B2 | 11/2004 | Preisler |
| 6,843,525 B2 | 1/2005 | Preisler |
| 6,890,023 B2 | 5/2005 | Preisler et al. |
| 6,918,625 B2 | 7/2005 | Storto et al. |
| 6,926,348 B2 | 8/2005 | Krueger et al. |
| 6,945,594 B1 | 9/2005 | Bejin et al. |
| 6,981,863 B2 | 1/2006 | Renault et al. |
| 7,014,259 B2 | 3/2006 | Heholt |
| 7,059,646 B1 | 6/2006 | DeLong et al. |
| 7,090,274 B1 | 8/2006 | Khan et al. |
| 7,093,879 B2 | 8/2006 | Putt et al. |
| 7,264,685 B2 | 9/2007 | Katz et al. |
| 7,320,739 B2 | 1/2008 | Thompson, Jr. et al. |
| 7,399,515 B1 | 7/2008 | Thele |
| 7,402,537 B1 | 7/2008 | Lenda et al. |
| 7,419,713 B2 | 9/2008 | Wilkens et al. |
| 7,628,440 B2 | 12/2009 | Bernhardsson et al. |
| 7,837,009 B2 | 11/2010 | Gross et al. |
| 7,909,379 B2 | 3/2011 | Winget et al. |
| 7,918,313 B2 | 4/2011 | Gross et al. |
| 7,919,031 B2 | 4/2011 | Winget et al. |
| 8,117,972 B2 | 2/2012 | Winget et al. |
| 2004/0037995 A1 | 2/2004 | Nicolai et al. |
| 2005/0189674 A1 | 9/2005 | Hochet et al. |
| 2006/0255611 A1 | 11/2006 | Smith et al. |
| 2008/0105866 A1 | 5/2008 | Jeong et al. |
| 2008/0145635 A1 | 6/2008 | Stoll et al. |
| 2010/0026031 A1 | 2/2010 | Jouraku |
| 2010/0060038 A1 | 3/2010 | Takakura et al. |
| 2011/0315310 A1 | 12/2011 | Trevisan et al. |

COMPRESSION-MOLDED COMPOSITE PANEL INCLUDING A LIVING HINGE HAVING A SCORE LINE WHICH FUNCTIONS AS A STYLE LINE

CROSS-REFERENCE TO RELATED APPLICATIONS

This application is a continuation-in-part of U.S. patent application entitled "Assembly Including A Compression-Molded Composite Panel With a Hinged Mounting Flange", filed Sep. 5, 2012 and having U.S. Ser. No. 13/603,552. That application is a continuation-in-part of both U.S. patent application entitled "Carpeted Automotive Vehicle Load Floor Having a Living Hinge" filed Apr. 23, 2012 and having U.S. Ser. No. 13/453,201 and U.S. patent application entitled "Method of Making a Sandwich-Type Composite Panel Having a Living Hinge and Panel Obtained by Performing the Method" also filed Apr. 23, 2012 and having U.S. Ser. No. 13/453,269.

TECHNICAL FIELD

This invention relates, in general, to the field of compression-molded, composite panels and, in particular, to such panels which have living hinges.

Overview

The term "facing material" refers to a material used to conceal and/or protect structural and/or functional elements from an observer. Common examples of facing materials include upholstery, carpeting, and wall coverings (including stationary and/or movable wall coverings and cubicle wall coverings). Facing materials typically provide a degree of aesthetic appearance and/or feel, but they may also provide a degree of physical protection to the elements that they conceal. In some applications, it is desirable that the facing material provide properties such as, for example, aesthetic appeal (for example, visual appearance and/or feel) and abrasion resistance.

Facing materials are widely used in motor vehicle construction. In the automotive industry, it is common practice to refer to various surfaces as being A-, B-, or C-surfaces.

As used herein, the term "A-surface" refers to an outwardly-facing surface for display in the interior of a motor vehicle. This surface is a very high visibility surface of the vehicle that is most important to the observer or that is most obvious to the direct line of vision. With respect to motor vehicle interiors examples include dashboards, instrument panels, steering wheels, head rests, upper seat portions, headliners, load floors and pillar coverings.

Sandwich-type composite panels including cores have very important characteristics because of their light weight and high strength. Conventionally, such panels are constructed by sandwiching a core having a large number of cavities and having low strength characteristics between two outer layers or skins, each of which is much thinner than the core but has excellent mechanical characteristics.

The prior art discloses a method of making a panel of sandwich-type composite structure having a cellular core in a single processing step. In that method, the panel is made by subjecting a stack of layers of material to cold-pressing in a mold. As shown in FIG. 1, the stack is made up of: at least a first skin made of a reinforced thermoplastics material, a cellular core made of a thermoplastics material, and a second skin also made of a reinforced thermoplastics material. The stack may also include one or more external covering layers made of a facing material such as woven or nonwoven thermoplastic material. The skins may be pre-heated outside the mold or heated inside the mold to a softening temperature.

Such a method is particularly advantageous because of the fact that it makes it possible, in a single operation, to generate cohesion and bonding between the various layers of the composite structure as shown in FIG. 2, and to shape the resulting panel while preserving all of the mechanical properties imparted by the cellular-core, sandwich structure.

Panels of sandwich-type composite structure having a cellular core have rigidity characteristics sufficient to enable mechanical structures subjected to large stresses to be reinforced structurally without making them too heavy. Such panels are in common use in shipbuilding, aircraft construction, and rail vehicle construction.

To maximize the functionality of such panels, it is known, in particular, that hinges can be added so that the panels can be hinged to other panels. Such hinges typically are separate parts that are fixed to the panels by gluing, welding, riveting, or some other fastening technique.

Such hinges are fixed to the sandwich-structure composite panels in a separate and subsequent operation, after said panels have been formed. That subsequent operation requires an additional workstation, be it automated or otherwise, which increases, in particular, the manufacturing time and cost of the finished parts.

In addition, the fact that separate, external parts are mounted on a composite panel of the sandwich-type is a source of quality defects, and thus adds to the cost of making such panels.

Published U.S. Patent Application 2005/0189674 discloses a method of making a composite panel of sandwich structure provided with a hinge. The panel includes a stack made up of a first skin of a reinforced thermoplastics material, a cellular core made of a thermoplastics material, and a second skin made of a reinforced thermoplastics material. The panel is formed by pressing the stack in a mold. The first and second skins are preheated to a softening temperature. As shown in FIGS. 3 and 4, after the panel has formed, an incision is made at a determined place in the panel so as to cut through one of the first and second skins, and substantially through the entire thickness of the cellular core, while leaving the other skin intact so that it forms a living hinge between two portions of the incised panel.

Other U.S. patent documents related to the present invention include: U.S. Pat. Nos. 5,298,694; 5,502,930; 5,915,445; 5,979,962; 6,050,630; 6,102,464; 6,435,577; 6,537,413; 6,631,785; 6,655,299; 6,659,223; 6,682,675; 6,719,363; 6,793,747; 6,748,876; 6,790,026; 6,682,676; 6,823,803; 6,843,525; 6,890,023; 6,981,863; 7,014,259; 7,090,274; 7,093,879; 7,264,685; 7,320,739; 7,402,537; 7,419,713; 7,837,009; 7,909,379; 7,918,313; 7,919,031; 8,117,972; 2005/0189674; 2006/0255611; 2008/0185866 and 2011/0315310.

One problem associated with prior art compression-molded, composite panels having living hinges and which have a facing material such as carpeting is that visible carpet imperfections and damage to the carpet (i.e. via pinching) often result due to the pivoting provided by the living hinge at least partially performed by the facing material or carpet. Such carpet or facing material imperfections or damage may degrade the aesthetic appearance of the panels as well as the functional requirements of the hinges.

SUMMARY OF EXAMPLE EMBODIMENTS

An object of at least one embodiment of the present invention is to provide a compression-molded, composite panel including a living hinge at least partially formed by facing material which has a score line which functions as a decorative and/or ornamental style line to mask facing material imperfections or damage (i.e. via pinching) at an outwardly-facing or "A" surface while at least partially defining a hinge which is strong enough for extended use.

In carrying out the above object and other objects of at least one embodiment of the present invention, a compression-molded, composite panel for a vehicle interior is provided. The panel includes first and second skins and a core positioned between the skins and having a large number of cavities. The first skin having an outer surface. The panel also includes a substantially continuous facing material layer having an outwardly-facing surface for display in the interior of the vehicle. The skins are bonded to the core and the facing material layer is bonded to the outer surface of the first skin by press molding. The press molding forms a first portion of the panel and a second portion of the panel pivotally connected to the first portion. The panel further includes a living hinge including a portion of the facing material layer which allows the second portion of the panel to pivot between different use positions relative to the first portion of the panel. The panel finally includes a score line formed by the press molding in the outwardly-facing surface of the portion of the facing material layer to at least partially define the living hinge and function as a style line to mask facing material damage or imperfections at the outwardly-facing surface.

The score line may include a decorative depression or groove.

A portion of the first skin may have a depression formed by the press molding. The depression may receive the portion of the facing material layer.

The first skin may be a fiber-reinforced thermoplastic skin.

The facing material layer may be a thermoplastic carpet layer.

The composite panel may have a thickness in the range of 5 to 25 mm.

The skins may be fiber-reinforced thermoplastic layers wherein the outer surface is a load bearing surface.

The core may be a cellular core.

The core may have a honeycomb structure.

Each of the skins may be fiber-reinforced.

The skins may be thermoplastic skins and the core may be a thermoplastic core.

The thermoplastic of the skins and the core may be polypropylene.

At least one of the skins may be a woven skin.

Each of the skins may be a woven skin.

Further in carrying out the above object and other objects of at least one embodiment of the present invention, a compression-molded, composite panel for a vehicle load floor is provided. The panel includes first and second skins and a core positioned between the skins and having a large number of cavities. The first skin has a top surface. The panel also includes a substantially continuous facing material layer having an outwardly-facing surface for display in an interior cargo compartment of the vehicle. The skins are bonded to the core and the facing material layer is bonded to the top surface of the first skin by press molding. The press molding forms a first portion of the panel and a second portion of the panel pivotally connected to the first portion. The panel still further includes a living hinge including a portion of the facing material layer which allows the second portion of the panel to pivot between different use positions relative to the first portion of the panel. The panel finally includes a score line formed by the press molding in the outwardly-facing surface of the portion of the facing material layer to at least partially form the living hinge and function as a style line to mask facing material imperfections or damage at the outwardly-facing surface.

The score line may include a decorative depression or groove.

A portion of the first skin may have a depression formed by the press-molding. The depression receives the portion of the facing material layer.

Still further in carrying out the above object and other objects of at least one embodiment of the present invention, a compression-molded, composite panel for a motor vehicle interior is provided. The panel includes first and second skins and a core positioned between the skins and having a large number of cavities. The first skin has an outer surface. The panel also includes a substantially continuous facing material layer having an outwardly-facing surface for display in an interior compartment of the vehicle. The skins are bonded to the core and the facing material layer is bonded to the outer surface of the first skin by press molding. The press molding forms a first portion of the panel and a second portion of the panel pivotally connected to the first portion. The panel still further includes a living hinge including a portion of the facing material layer which allows the second portion of the panel to pivot between different use positions relative to the first portion of the panel. The panel finally includes a score line formed by the press molding in the outwardly-facing surface of the portion of the facing material layer to at least partially form the living hinge and function as a style line to mask facing material imperfections or damage at the outwardly facing surface.

The score line may include a decorative depression or groove.

A portion of the first skin may have a depression formed by the press molding. The depression receives the portion of the facing material layer.

Other technical advantages will be readily apparent to one skilled in the art from the following figures, descriptions and claims. Moreover, while specific advantages have been enumerated, various embodiments may include all, some or none of the enumerated advantages.

DETAILED DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms.

The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
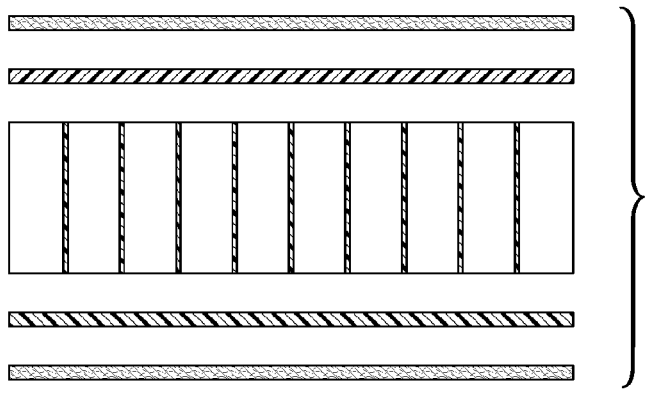
FIG. 1 is a side sectional view showing various separate layers of a prior art stack of thermoplastic-based layers of material.
Figure 2:
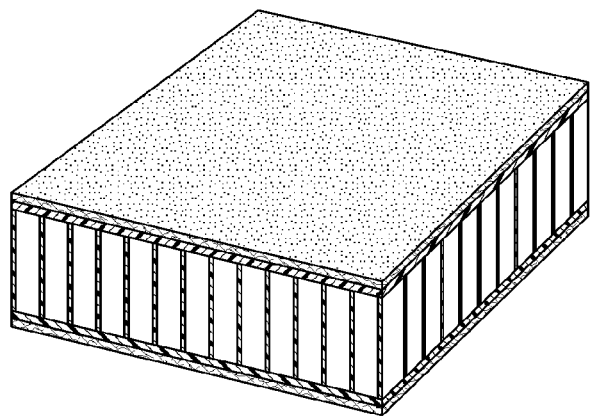
FIG. 2 is a top perspective sectional view of the stack of FIG. 1 after compression molding.
Figure 3:
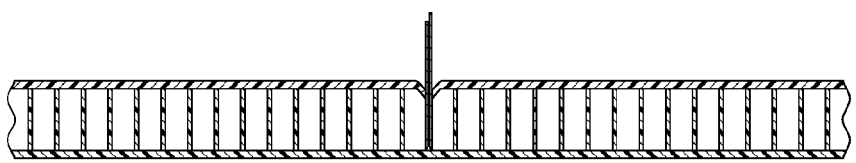
FIGS. 3 and 4 are side views, partially broken away and in cross section, of a prior art sandwich-type composite panel having a living hinge and method of making the living hinge.
Figure 4:
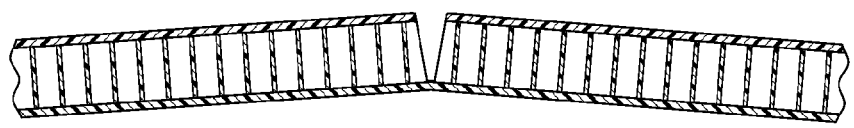
Figure 5:
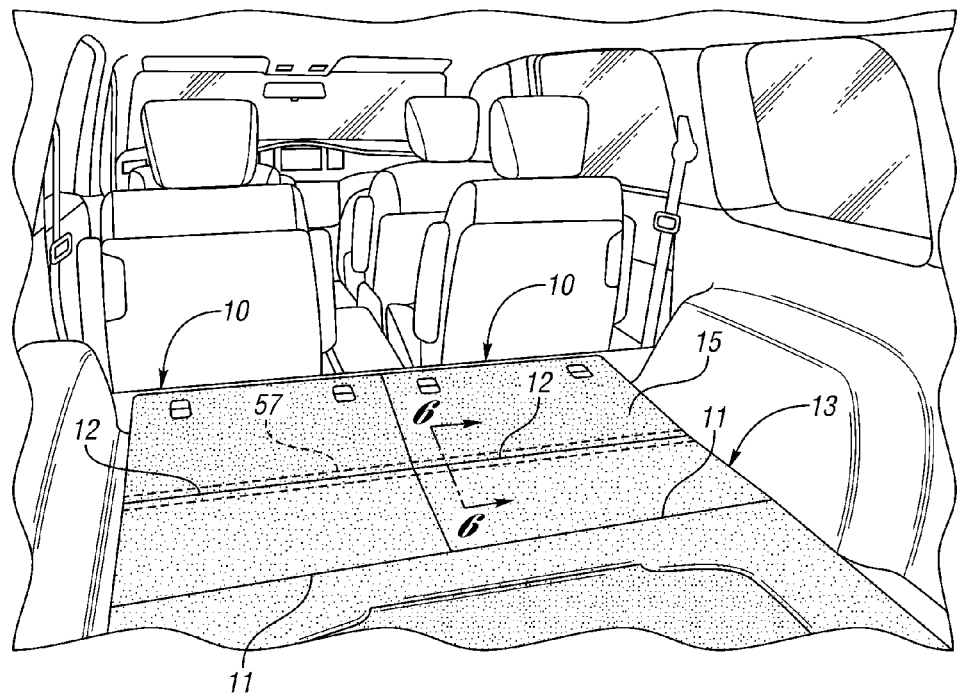
FIG. 5 is an environmental view, partially broken away, of a carpeted automotive vehicle load floor including a pair of carpeted, sandwich-type, compression-molded, composite panel assemblies each being constructed in accordance with at least one embodiment of the present invention.
Figure 6:
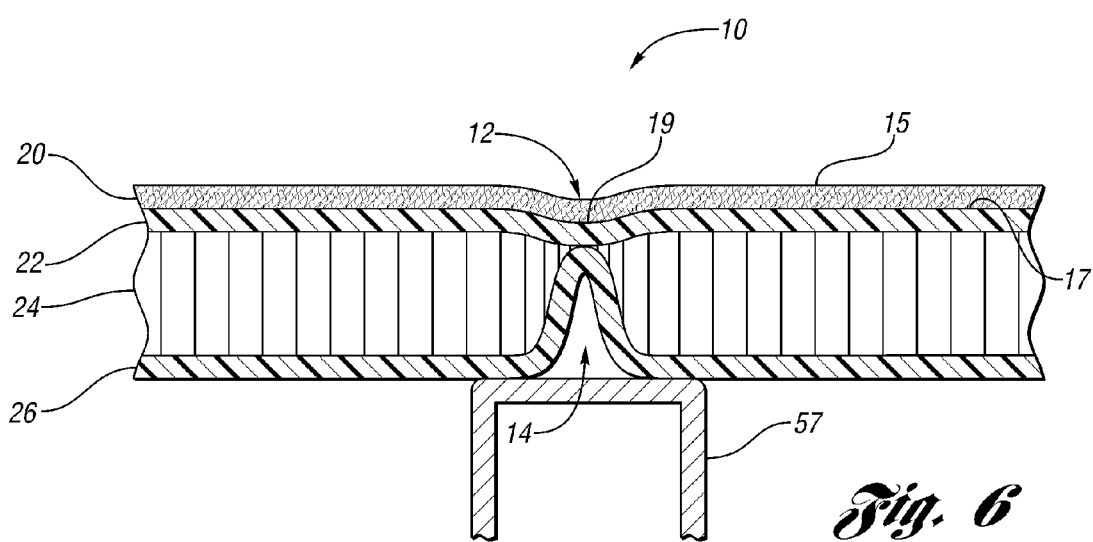
FIG. 6 is a side view, partially broken away and in cross section, of one embodiment of one of the panel assemblies taken along lines 6-6 of FIG. 5.

Referring now to the FIGS. 5 and 6, one embodiment of a compression-molded, composite panel is provided. In one example embodiment, a carpeted automotive vehicle load floor, generally indicated at 13, includes a pair of carpeted, compression-molded, sandwich-type, composite hinged panels, generally included at 10. In one example embodiment, each panel 10 has a pair of living hinges 14. In the example embodiment, the panel 10 has the living hinges 14 and a corresponding pair of score lines which function as decorative and/or ornamental style lines or elongated top decorative depressions 11 and 12. The depressions 11 and 12 mask facing material imperfections or damage (such as by pinching) at an outwardly-facing (i.e. A-surface) of carpet 20. However, it is to be understood that one or more panels 10 constructed in accordance with at least one embodiment of the present invention may be used in a wide variety of environments besides the automotive vehicle environment of FIG. 5.

Each panel 10 is typically manufactured by providing a stack of materials located or positioned within a mold. The stack includes first and second reinforced thermoplastic skins or outer layers 22 and 26, respectively, a core having a large number of cavities such as a thermoplastic cellular core 24 disposed between and bonded to the skins 26 and 22 by press molding within the mold. A substantially continuous covering or carpet layer 20 made of thermoplastics material covers and is bonded to the first skin 22 which provides a top carpeted support surface 15. The skins 26 and 22 are heated typically outside of the mold to a softening temperature. The mold is preferably a low-pressure, compression mold which performs a thermo-compression process on the stack of materials.

The panel 10 and the outer skin 22 is divided by the living hinge 14 into a first portion bonded to a first portion of the core 24 and a second portion bonded to a second portion of the core 20, both of which have a large number of cavities. The living hinge 14 allows the second portion of the panel 10 to pivot between different use positions relative to the first portion of the panel 10.

Portions of the thermoplastic carpet layer 20 cover and are bonded to an upper surface 17 of the skin 22 to provide the upper carpeted support surface 15. An intermediate portion of the layer 20 at least partially forms the living hinge 14. The living hinge 14 allows the carpeted second portion of the panel 10 to pivot between the different use positions.

The load floor 13 may also include a plastic or metal support or bar 57 which extends across the width of the storage area under the panels 10 to support the panels 10 at their living hinges 14.

The carpet layer 20 may be a resin carpet and the resin may be polypropylene. The carpet layer 20 may be made of a woven or nonwoven material (typically of the carpet type).

The decorative depression 12 may be a relatively deep decorative depression formed during the compression molding process by a projection supported or suspended at the inner mold surface of an upper mold half. A portion of the top skin 22 also has a depression 19 formed by the press molding. The depression 19 receives the portion of the carpet 20 which at least partially forms the living hinges 12 and which functions as style line to mask damage or imperfections of the carpet 20 at the A-surface 15.

The cellular core 24 may be a honeycomb core. In this example, the cellular core 24 has an open-celled structure of the type made up of tubes or a honeycomb, and it is made mainly of polyolefin and preferably of polypropylene. It is also possible to use a cellular structure having closed cells of the foam type.

Each of the skins 26 and 22 of each of the panels 10 may be fiber reinforced. The thermoplastic of the skins 26 and 22, the covering facing material or carpet layer 20 and the core 24 may be polypropylene. At least one of the skins 26 and 22 may be a woven skin, such as polypropylene skin. Each of the skins 26 and 22 may be reinforced with fibers, e.g., glass fibers, carbon fibers or natural fibers. At least one of the skins 26 and 22 may advantageously be made up of woven glass fiber fabric and of a thermoplastics material.

Each resulting hinged panel 10 may have a thickness in the range of 5 to 25 mm. The depression 12 formed in the panel may have a depth in the range of 0.2 to 2 mm.

In one example method of making the hinged panel 10, a stack of material is pressed in a low pressure, cold-forming mold. The stack is made up of the first skin 22, the cellular core 24, the second skin 26 and the covering or facing material layer 26. The stack is pressed at a pressure lying in the range of $10 \times 10^5$ Pa. to $30 \times 10^5$ Pa. The first and second skins 22 and 26, respectively, are preferably pre-heated to make them malleable and stretchable. Advantageously, in order to soften the first and second skins 22 and 26, respectively, heat is applied to a pre-assembly constituted by the stack made up of at least the first skin 22, of the cellular core 24, and the second skin 26 so that, while the panel 10 is being formed in the mold, the first and second skins 22 and 26 have a forming temperature lying approximately in the range of 160° C. to 200° C., and, in this example, about 180° C. In like fashion, the living hinge 14 and the depression or score line 12 may be formed. However, the living hinge 14 may be formed by performing the method of the above-noted patent application entitled "Method of Making a Sandwich Type Composite Panel Having a Living Hinge and Panel Obtained by Performing the Method."

The covering carpet layer 20 is substantially continuous and may be formed from separate pieces of thermoplastic resin carpet which are subsequently bonded or fused together, such as by heat and/or pressure to carpet the entire top support surface 15 of the hinged panel 10.

In summary, FIG. 6 shows a carpeted, sandwich-type, composite hinged panel 10. The panel 10 has one or more living hinges 12 with one or more decorative grooves 12.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A compression-molded, composite panel for a vehicle interior, the panel comprising:

first and second skins and a core positioned between the skins and having a large number of cavities, the first skin having an outer surface;

a substantially continuous facing material layer having an outwardly-facing surface for display in the interior of the vehicle, the skins being bonded to the core and the facing material layer being bonded to the outer surface of the first skin by press molding, the press molding forming a first portion of the panel and a second portion of the panel pivotally connected to the first portion;

a living hinge including a portion of the facing material layer which allows the second portion of the panel to pivot between different use positions relative to the first portion of the panel; and a score line formed by the press molding in the outwardly-facing surface of the portion of the facing material layer to at least partially define the living hinge and function as a style line to mask facing material damage or imperfections at the outwardly-facing surface.

2. The panel as claimed in claim 1, wherein the score line includes a decorative depression or groove.

3. The panel as claimed in claim 1, wherein a portion of the first skin has a depression formed by the press molding, the depression receiving the portion of the facing material layer.

4. The panel as claimed in claim 1, wherein the first skin is a fiber-reinforced thermoplastic skin.

5. The panel as claimed in claim 4, wherein the facing material layer is a thermoplastic carpet layer.

6. The panel as claimed in claim 1, wherein the composite panel has a thickness in the range of 5 to 25 mm.

7. The panel as claimed in claim 1, wherein the skins are fiber-reinforced thermoplastic layers and wherein the outer surface is a load bearing surface.

8. The panel as claimed in claim 1, wherein the core is a cellular core.

9. The panel as claimed in claim 1, wherein the core has a honeycomb structure.

10. The panel as claimed in claim 1, wherein each of the skins is fiber-reinforced.

11. The panel as claimed in claim 1, wherein the skins are thermoplastic skins and the core is a thermoplastic core.

12. The panel as claimed in claim 11, wherein the thermoplastic of the skins and the core is polypropylene.

13. The panel as claimed in claim 1, wherein at least one of the skins is a woven skin.

14. The panel as claimed in claim 13, wherein each of the skins is a woven skin.

15. A compression-molded, composite panel for a vehicle load floor, the panel comprising:

first and second skins and a core positioned between the skins and having a large number of cavities, the first skin having a top surface;

a substantially continuous facing material layer having an outwardly-facing surface for display in an interior cargo compartment of the vehicle, the skins being bonded to the core and the facing material layer being bonded to the top surface of the first skin by press molding, the press molding forming a first portion of the panel and a second portion of the panel pivotally connected to the first portion;

a living hinge including a portion of the facing material layer which allows the second portion of the panel to pivot between different use positions relative to the first portion of the panel; and a score line formed by the press molding in the outwardly-facing surface of the portion of the facing material layer to at least partially form the living hinge and function as a style line to mask facing material imperfections or damage at the outwardly-facing surface.

16. The panel as claimed in claim 15, wherein the score line includes a decorative depression or groove.

17. The panel as claimed in claim 15, wherein a portion of the first skin has a depression formed by the press-molding, the depression receiving the portion of the facing material layer.

18. A compression-molded, composite panel for a motor vehicle interior, the panel comprising:

first and second skins and a core positioned between the skins and having a large number of cavities, the first skin having an outer surface;

a substantially continuous facing material layer having an outwardly-facing surface for display in an interior compartment of the vehicle, the skins being bonded to the core and the facing material layer being bonded to the outer surface of the first skin by press molding, the press molding forming a first portion of the panel and a second portion of the panel pivotally connected to the first portion;

a living hinge including a portion of the facing material layer which allows the second portion of the panel to pivot between different use positions relative to the first portion of the panel; and a score line formed by the press molding in the outwardly-facing surface of the portion of the facing material layer to at least partially form the living hinge and function as a style line to mask facing material imperfections or damage at the outwardly facing surface.

19. The panel as claimed in claim 18, wherein the score line includes a decorative depression or groove.

20. The panel as claimed in claim 18, wherein a portion of the first skin has a depression formed by the press molding, the depression receiving the portion of the facing material layer.

* * * * *